US011324013B2

(12) United States Patent
Burchard et al.

(10) Patent No.: US 11,324,013 B2
(45) Date of Patent: May 3, 2022

(54) WIRELESS COMMUNICATION WITH CHANNEL SUPPRESSION

(71) Applicant: NXP B.V., Eindhoven (NL)

(72) Inventors: Artur Burchard, Eindhoven (NL); Alessio Filippi, Eindhoven (NL); Marc Klaassen, Waalre (NL); Cornelis Marinus Moerman, Waalre (NL)

(73) Assignee: NXP B.V., Eindhoven (NL)

( * ) Notice: Subject to any disclaimer, the term of this patent is extended or adjusted under 35 U.S.C. 154(b) by 175 days.

(21) Appl. No.: 16/829,254

(22) Filed: Mar. 25, 2020

(65) Prior Publication Data

US 2021/0307019 A1 Sep. 30, 2021

(51) Int. Cl.
*H04W 72/08* (2009.01)
*H04B 17/345* (2015.01)
*H04W 16/14* (2009.01)
*H04B 17/336* (2015.01)
*H04L 5/00* (2006.01)

(52) U.S. Cl.
CPC ........ *H04W 72/082* (2013.01); *H04B 17/336* (2015.01); *H04B 17/345* (2015.01); *H04L 5/0053* (2013.01); *H04W 16/14* (2013.01)

(58) Field of Classification Search
CPC .. H04W 72/082; H04W 16/14; H04B 17/336; H04B 17/345; H04L 5/0053
See application file for complete search history.

(56) References Cited

U.S. PATENT DOCUMENTS

| | | | | |
|---|---|---|---|---|
| 6,131,013 A | * | 10/2000 | Bergstrom | H04B 1/123 455/63.1 |
| 7,496,164 B1 | * | 2/2009 | Mostafa | H04B 17/345 375/346 |
| 8,462,646 B2 | | 6/2013 | Barberis et al. | |
| 8,660,102 B2 | | 2/2014 | Xu et al. | |
| 2007/0254590 A1 | * | 11/2007 | Lopez | H04B 1/1036 455/63.1 |
| 2009/0110033 A1 | | 4/2009 | Shattil | |
| 2015/0003270 A1 | | 1/2015 | Jamadagni et al. | |
| 2017/0295582 A1 | * | 10/2017 | Gurney | H04W 72/082 |

* cited by examiner

*Primary Examiner* — Duc C Ho

(57) ABSTRACT

Aspects of the present disclosure are directed toward effecting communications in a manner that suppresses side-channel communications that may otherwise cause interference. As may be implemented in a manner consistent with one or more aspects characterized herein, an apparatus and/or method involve transmitting enhanced signals for in-band transmissions over a first one of a plurality of wireless communications channels shared by a plurality of stations for communicating wireless station-to-station communications. While transmitting the enhanced signals, communications by legacy devices on a second one of the wireless communications channels adjacent the first channel are suppressed by generating and transmitting a side channel interference signal on the second channel, therein causing legacy devices receiving the enhanced signals to withhold communications on the second channel.

20 Claims, 9 Drawing Sheets

WIRELESS COMMUNICATION WITH CHANNEL SUPPRESSION

OVERVIEW

Aspects of various embodiments are directed to suppressing communications on channels, such as one or more channels adjacent a channel being used for communications.

In wireless communication, energy transmitted on a particular channel may leak into neighboring channels, potentially causing interference. Many wireless standards allow a certain amount of energy to leak into neighboring channels, as such leakage may be difficult to prevent. The amount of energy (e.g., signal level) allowed to be emitted out of band may be defined by a transmit mask specific to a standard, and may be indicated by a maximum energy value versus frequency spectrum. The amount of interfering energy arriving at a receiver tuned to a neighboring channel depends on characteristics such as the distance between transmitter and receiver. Such standards may also define a minimum receiver sensitivity level, which is a minimum signal level at which a receiver is required to detect and receive a transmission.

Accordingly, when communications are effected on adjacent channels, those communications may interfere with one another. Further, as certain transmitters may not recognize that an interference issue may be caused when transmitting on an adjacent channel, such transmitters may operate in a manner that causes interference with other transmitters. These and other matters have presented challenges to efficiencies of wireless communications implementations, for a variety of applications.

SUMMARY

Various example embodiments are directed to issues such as those addressed above and/or others that may become apparent from the following disclosure concerning signal interference, and compatibility between respective communications standards such as between newer/enhanced type communications and older/legacy type communications.

In certain example embodiments, aspects of the present disclosure involve mitigating interference or otherwise ensuring accurate enhanced signal communications, by suppressing legacy communications on channels adjacent those used for enhanced communications via introduced side channel interference. Such approaches may thus cause legacy type devices to suppress communications in response to the side channel interference. For instance, an "improved transmitter" may be extended such that it adds known side-band signals in neighboring channels to cause synthetic inter-channel interference at levels as defined by a standard. Such synthetic interference may for example include a tone at the center carrier of the neighboring channel(s), or a known sequence occupying the neighboring channel, or the same signal transmitted in the wanted channel (e.g., at an appropriate output power below transmission mask limits).

In a more specific example embodiment, an apparatus includes communications circuitry and signal processing circuitry. The communications circuitry is configured and arranged to communicate wireless station-to-station communications in which each of a plurality of stations shares a plurality of wireless communications channels. The signal processing circuitry is configured and arranged with the communications circuitry to transmit enhanced signals for in-band transmissions over a first one of the channels. While transmitting the enhanced signals, the signal processing circuitry suppresses communications by legacy devices on a second one of the channels adjacent the first channel, by generating and transmitting a side channel interference signal on the second channel, therein causing legacy devices receiving the enhanced signals to withhold communications on the second channel in response to the side channel interference.

In another specific example embodiment, a method is carried out as follows. Enhanced signals are transmitted for in-band transmissions over a first of a plurality of wireless communications channels that are shared by a plurality of stations for communicating wireless station-to-station communications. While transmitting the enhanced signals, communications by legacy devices on a second one of the plurality of wireless communications channels that is adjacent the first channel are suppressed by generating and transmitting a side channel interference signal on the second channel, therein causing legacy devices receiving the enhanced signals to withhold communications on the second channel in response to the side channel interference.

Another embodiment is directed to an apparatus comprising communications circuitry, signal generator circuitry and side band signal generator circuitry. The communications circuitry is configured and arranged to transmit and receive multichannel signals over a wireless network in which each of a plurality of stations utilizes wireless communications channels. The signal generator circuitry is configured and arranged to generate a data signal for transmitting data on one of the communications channels. The side band signal generator circuitry is configured and arranged to generate an artificial interference signal for transmitting interference on side channels adjacent the one of the communications channels. The communications circuitry is further configured to transmit a multichannel signal having the data signal in the one of the communications channels and the artificial interference signal on the side channels adjacent the one of the communications channels.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
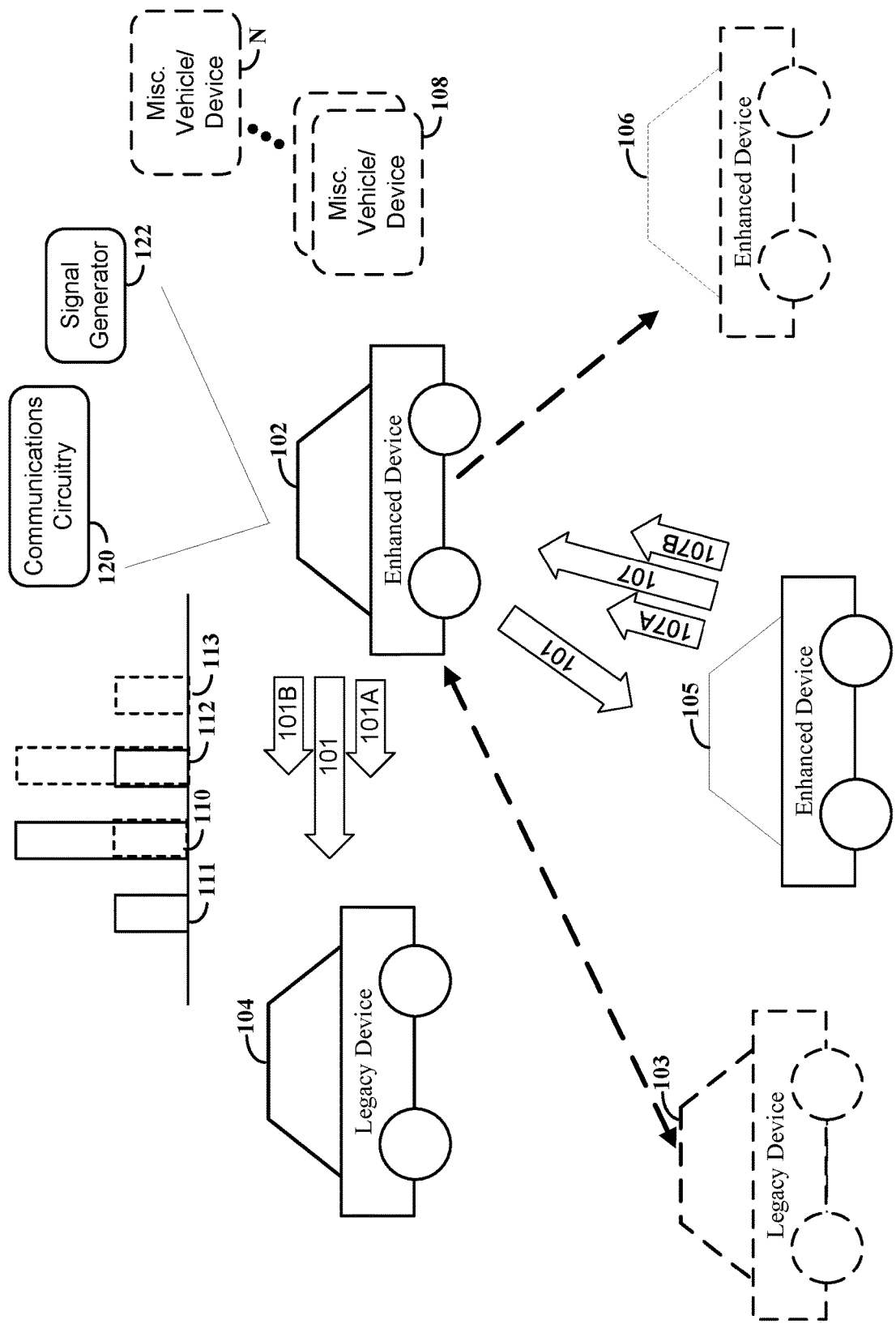
FIG. 1 is a system-level diagram illustrating an example communication apparatus with channel suppression, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving communications over adjacent channels that are susceptible to interference. In certain implementations, aspects of the present disclosure have been shown to be beneficial when used in the context of suppressing communications of devices on a particular channel that would otherwise generate interference in adjacent channels. Various embodiments suppress communications by creating and transmitting data on side channels adjacent a channel via which a communication is made, therein preventing other devices from communicating on those side channels. While not necessarily so limited, various aspects may be appreciated through the following discussion of non-limiting examples that use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. In addition, although aspects and features may in some cases be described in individual figures, it will be appreciated that features from one figure or embodiment can be combined with features of another figure or embodiment even though the combination is not explicitly shown or explicitly described as a combination.

Various aspects of the present disclosure are directed to multi-channel communications in which an artificial signal is transmitted on channels adjacent the channel via which a desired communication is made. This approach may suppress communications on the adjacent channel by other devices that otherwise operate the adjacent channels when they are free. This suppression can mitigate issues that may be created when such other devices transmit signals on the adjacent channels in which the signals may leak onto adjacent channels. Such approaches may be useful, for example, in communication environments involving a mix of different types of communication devices including multichannel devices (which may have wideband and enhanced selectivity) and other devices such as single channel devices (which may exhibit narrower band and limited selectivity) operating in the same area. Artificially generated interference may thus cause transmitters on a neighboring channel to withhold their transmissions automatically via CCA (clear channel assessment) MAC (media access control) policies, yet can be recognized by enhanced transmitters. In certain implementations, the artificial signal is identified and ignored or cancelled out by multichannel devices configured to recognize and use such signals. Accordingly, new multichannel devices may operate with legacy-type devices that do not utilize such an artificial signal, while preserving efficiency and operability aspects of multichannel communications when only new devices are operating.

In general, embodiments characterized herein may be applied to systems that use listen-before-talk (clear channel assessment) access policy to a channel, for instance in Wi-Fi standards such as 802.11a, 802.11n, and 802.11ac. Various embodiments may be implemented with IEEE802.11p V2X devices operating at several channels of the 5.9 GHz band. This technology may be implemented with few (e.g., 7) 10 MHz channels, for multichannel and wideband operation.

In a more specific example embodiment, an apparatus includes communications circuitry for wireless station-to-station communications in which stations share wireless communications channels, and signal processing circuitry for transmitting enhanced signals for in-band transmissions over a first one of the channels. The signal processing circuitry suppresses communications by legacy devices on a second (and/or third) one of the channels adjacent the first channel by generating and transmitting a side channel interference signal on the second channel. This causes legacy devices receiving the enhanced signals to withhold communications on the second channel in response to the side channel interference. This signal communication may further involve simultaneously communicating (data) signals on multiple ones of the wireless communications channels, which may also involve utilizing additional side channel interference signals.

The signal processing circuitry may be implemented in a variety of manners. In some embodiments, the signal processing circuitry facilitates detection and removal of such side channel interference signals by transmitting a side channel interference signal having a predefined characteristic. This predefined characteristic, if known by other enhanced receivers, may be utilized to remove side channel interference in received signals. Accordingly, the signal processing circuitry may communicate on the adjacent one of the channels in response to identifying communications thereon having the predefined side channel interference signal, such as by transmitting or receiving data on the adjacent channel. Where the received communications are enhanced signals received from another one of the plurality of stations, the processing circuitry effectively facilitates such transmission by generating the side channel interference signal with characteristics detectable by the station sending the enhanced signals.

In some implementations, the signal processing circuitry transmits signals on channels adjacent those in which enhanced signals are transmitted, and in which a predefined side-channel interference signal is received, in response to identifying the predefined side channel interference. Further, where enhanced communications are detected on one channel adjacent a channel in which an enhanced signal is to be transmitted, the transmission of side channel interference on such a channel may be omitted while transmitting the enhanced signals along with side channel interference on an opposite adjacent channel.

In a more particular embodiment, the signal processing circuitry includes a wideband signal generator configured to generate the enhanced signals as wide band signals, and a side band signal generator configured to generate the channel interference signal. The processing circuitry operates with the communications circuitry to transmit each wide band signal and corresponding interference signal as a multichannel signal on the first and second channels. The signal processing circuitry further includes circuitry configured to detect and remove side band signals based on the channel interference signal generated by the side band signal generator.

Various methods may be carried out in accordance with one or more embodiments, such as those characterized with the apparatus-based embodiments above and/or with the structure shown in the various figures. In a specific embodiment, enhanced signals are transmitted for in-band transmissions over a first of a plurality of wireless communications channels shared by stations for wireless station-to-station communications. While transmitting the enhanced signals, communications by legacy devices on a second one or more other channels of the plurality of wireless communications channels that is adjacent the first channel are suppressed by generating and transmitting a side channel interference signal on the second channel, therein causing legacy devices receiving the enhanced signals to withhold communications on the second channel in response to the side channel interference. Detection and removal of the side channel interference signal may be facilitated by utilizing side channel interference signals having a predefined characteristic. Multiband transmission may further be facilitated by transmitting another enhanced signal on another channel, concurrently with the enhanced signals transmitted over the first one of the wireless communications channels.

For enhanced signals transmitted on one of the channels along with a predefined side-channel interference signal on an adjacent one of the channels, communications may be effected on the adjacent one of the channels in response to identifying the communications on the adjacent one of the channels as being the predefined side channel interference signal (e.g., coming from a local or remote transmitter). In some instances, the predefined side channel interference may be removed by identifying the interference based on the predefined signal. Further, signals may be transmitted on the adjacent one of the channels in response to identifying communications on the adjacent one of the channels as being predefined side channel interference.

Turning now to the figures, FIG. 1 is a system-level diagram illustrating example communications with channel suppression, in accordance with the present disclosure. By way of example, several communication stations are shown implemented with vehicles 102-106 and with miscellaneous vehicles or other devices 108-N, all of which may participate in a communications environment. Fewer or more such stations may be implemented, with dashed lines shown to emphasize this aspect.

Referring to an enhanced communication station at vehicle 102, communications thereat are effected (e.g., using communications and processing circuitry) in which communications by other stations on adjacent channels are suppressed by generating and transmitting side channel interference on one or more channels adjacent a channel via which enhanced signals are communicated. For instance, an enhanced signal 101 communicated on a main channel 110 (shown in solid lines) may be accompanied by side channel interference on adjacent channels 111 and/or 112. This interference can be used to suppress communications in other devices on those side channels.

As a particular example, legacy device at 104 may carry out transmissions that undesirably leak over onto adjacent channels, such as by communicating a legacy signal (shown in dashed lines) on channel 112, which may reach over onto channels 110 and 113. The legacy device 104 may not be able to detect the enhanced signal 101 communicated on channel 110, which may result in the legacy device communicating a legacy signal simultaneously with enhanced signal 101, which may cause interference. For instance, if legacy device were to communicate a legacy signal (depicted in dashed lines) on channel 112 and if that signal extends over onto channel 110, it may interfere with the enhanced signal 101 as communicated on channel 110.

Accordingly, the enhanced station at 102 is configured to suppress communications on channel 112 (or on channel 111) by the legacy device at 104, by generating and transmitting separate side channel signals 101A and 101B on channels 111 and 112. The legacy device 104 responds to detecting this side channel interference by suppressing or otherwise not communicating its legacy signals on channels 111 or 112 (or, for that matter, on channel 110 in which the enhanced signal 101 is being communicated).

In a particular embodiment another enhanced station at 105 is used to communicate simultaneously with enhanced signal 101, with the enhanced station being configured to detect (and, e.g., remove or ignore) the side channel signals 101A and 101B as known signals transmitted for purposes of suppressing legacy transmissions. As such, the enhanced station at 105 may transmit an enhanced signal 107 (shown in dashed lines on channel 112), immediately adjacent channel 110. The enhanced station may further transmit side channel signals 107A and/or 107B (also shown dashed on channels 110 and 113). The enhanced device at 102 may receive these signals, remove or ignore the side channel signals and process the signal received on channel 112.

As such, enhanced stations may communicate on immediately adjacent channels while mitigating legacy communications on those channels. Such synthetic side channel communications may use known characteristics, such as may be defined by a standard, such as a tone at a center carrier of the neighboring channel(s), a known sequence occupying the neighboring channel, or the same signal transmitted in the wanted channel but at output power below transmission mask limits. As an alternative, a known sequence could be a selection of tones located at empty subcarriers as defined by a standard in use (e.g., the center sub-carrier or the subcarriers at the edge of the spectrum) so that it will be orthogonal to the wanted signal such that it does not have to be removed and will be ignored by receivers configured appropriately.

In some implementations, the enhanced device at 102 includes communications circuitry 120 and signal generator circuitry 122, which includes signal processing circuitry. The communications circuitry communicates wireless station-to-station communications in which each of a plurality of stations (e.g., at 102-106) shares a plurality of wireless communications channels. The signal processing circuitry operates with the communications circuitry to transmit enhanced signals for in-band transmissions over a first one of the channels, and suppresses communications by legacy devices on a second one of the channels adjacent the first channel by generating and transmitting a side channel interference signal on the second channel.

In some implementations, the signal generator circuitry 122 includes a data signal generator and a side band signal generator. The communications circuitry 120 is configured to transmit and receive multichannel signals over a wireless network in which each of a plurality of stations, such as 102-106 and 108-N, utilizes wireless communications channels. The data signal generator generates a data signal for transmitting data on one of the communications channels, and the side band signal generator generates an artificial interference signal for transmitting interference on side channels adjacent the one of the communications channels. The communications circuitry 120 transmits a multichannel signal having the data signal in the one of the communications channels and the artificial interference signal on the side channels adjacent the one of the communications channels (e.g., with a data signal on channel 110 and the artificial interference signals on channels 111 and 112).

Figure 2:
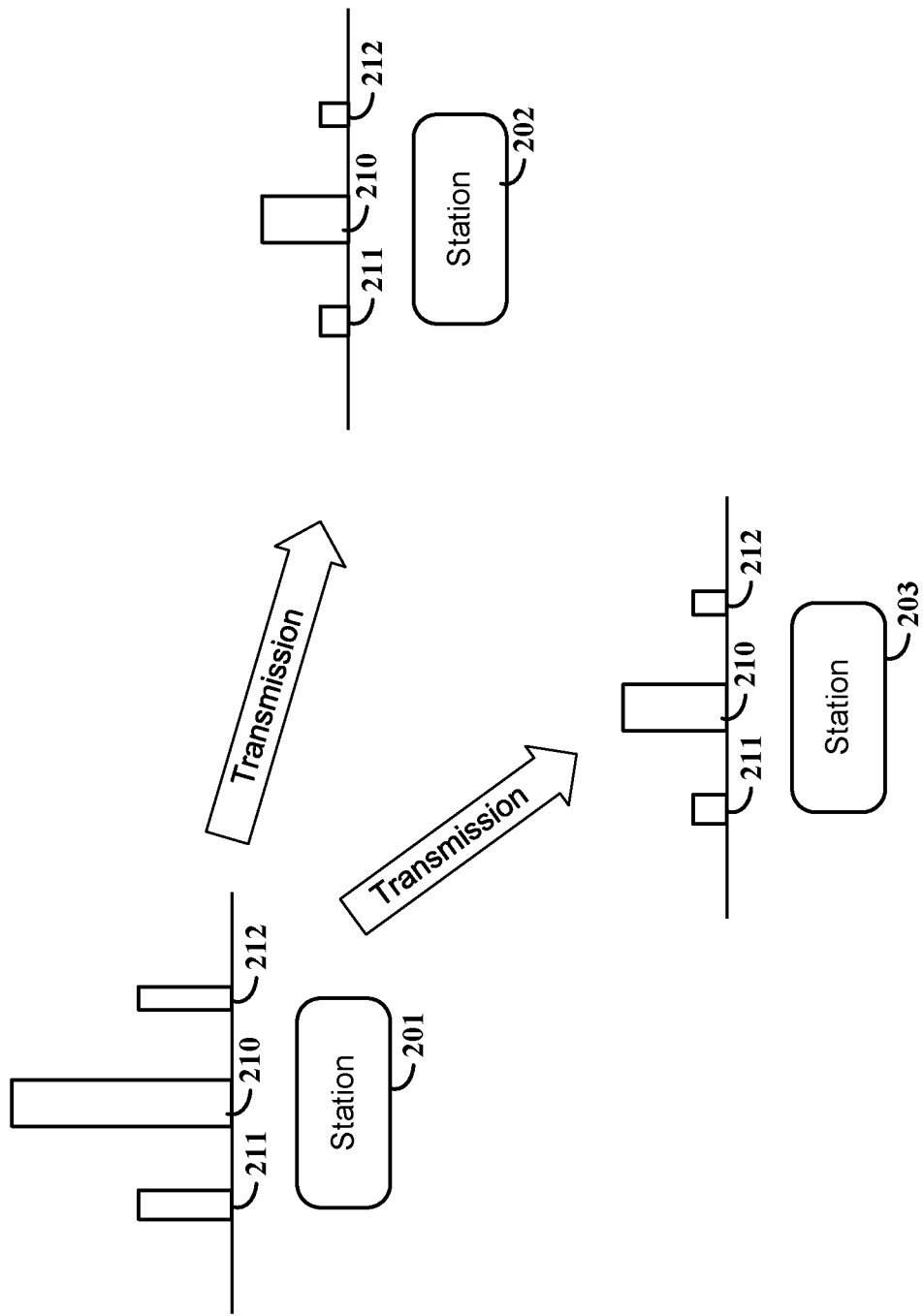
FIG. 2 shows communications stations and related communications effected for channel suppression, in accordance with the present disclosure.

FIG. 2 shows communications stations 201, 202 and 203 with related communications effected for channel suppression, in accordance with the present disclosure. Station 201 transmits a signal on channel 210 along with two side band signals on adjacent channels 211 and 212 for suppressing communications from other stations, as may be implemented in a manner as characterized herein. For instance, where station 202 and/or 203 may not be capable of transmitting on one of the adjacent channels 211 and 212 without overlapping onto channel 210, the side band signals on channels 211 and 212 cause the station to suppress communication on that channel. Further, in instances where other enhanced stations are present, for example where station 202 is enhanced and station 203 is a legacy station, the enhanced station 202 may detect that the side band signal on channels 211 and 212 is intended to suppress legacy communications, and may proceed to transmit on one or both of these channels without causing interference on channel 210.

Figure 3:
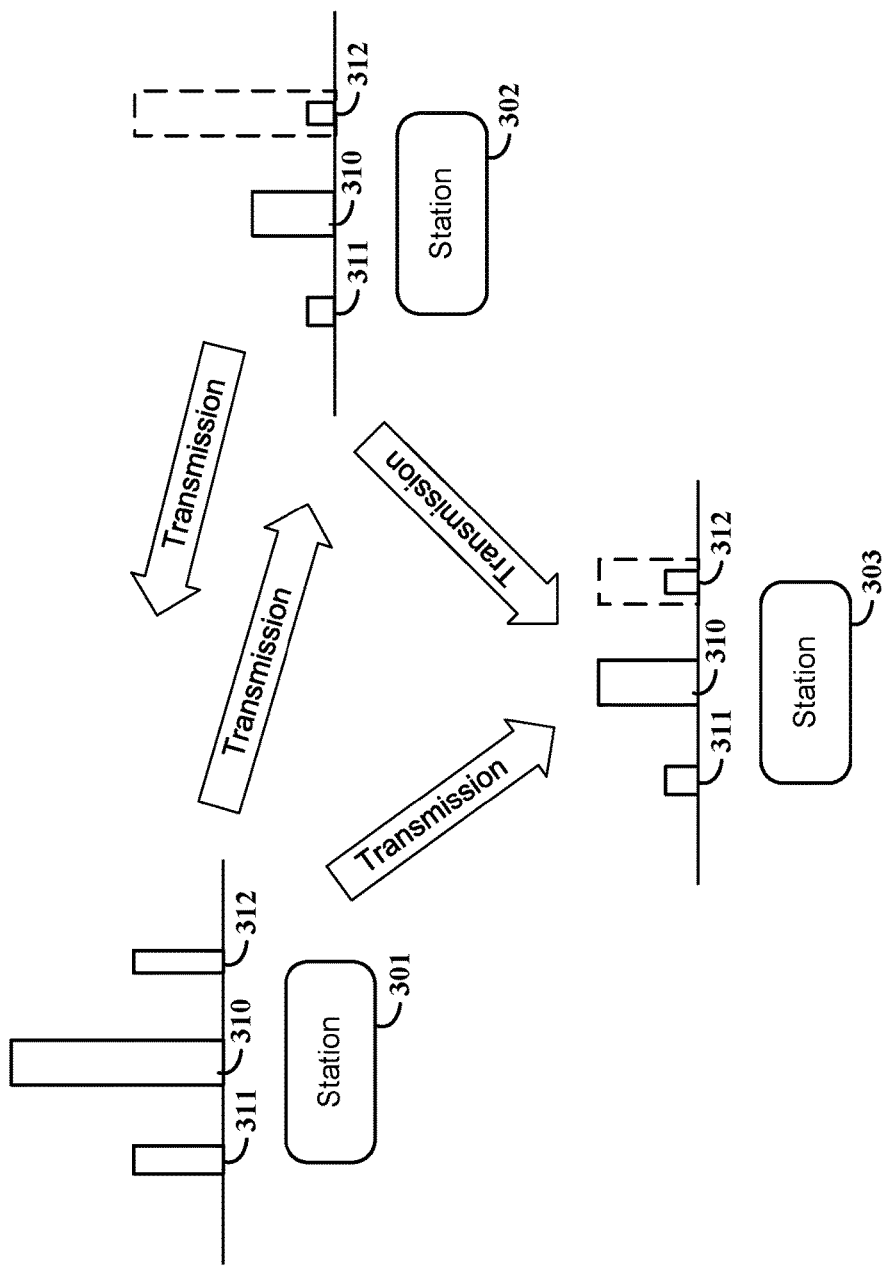
FIG. 3 shows communications stations and related communications effected for channel suppression with detection and communication by another station on a side channel, in accordance with the present disclosure.

FIG. 3 shows communications stations 301, 302 and 303, with related communications effected for channel suppression with detection and communication by another station on a side channel, in accordance with the present disclosure. The approach shown in FIG. 3 is similar to that shown in FIG. 2, with station 301 operating in accordance with station 201 by transmitting a signal on channel 310 along with side channel signals on adjacent channels 311 and 312 to suppress communication from certain stations (e.g., legacy). Station 302 has advanced configuration for detecting the side channel signals and recognizing that these are for suppressing legacy communications.

Accordingly, station 302 may communicate by generating an additional transmission (shown dashed) on channel 312, while station 301 is transmitting on channel 310, with an accuracy that does not impede the signal transmitted by station 301 on channel 310. Station 302 may thus receive the signal transmitted by station 301 on channel 310 and ignore or remove the side band signals transmitted on channels 311 and 312 when listening for signals thereon. Station 301 may further receive the signal transmitted by station 302 on channel 312, while transmitting on adjacent channel 310. In certain instances, station 302 also generates and transmits side band signals on channel 310 and another channel adjacent channel 312 (opposite 310, not shown).

Station 303 may operate by suppressing any communication on channel 310 due to the signal from station 301, and suppressing communication on channel 312 due to the signal from station 302. If station 303 is implemented with enhanced technology, it may recognize that the signal transmitted by station 301 on channel 311 is intended to suppress legacy communications, and remove that signal when listening on channel 311 and/or utilize channel 311 for communicating.

Figure 4:
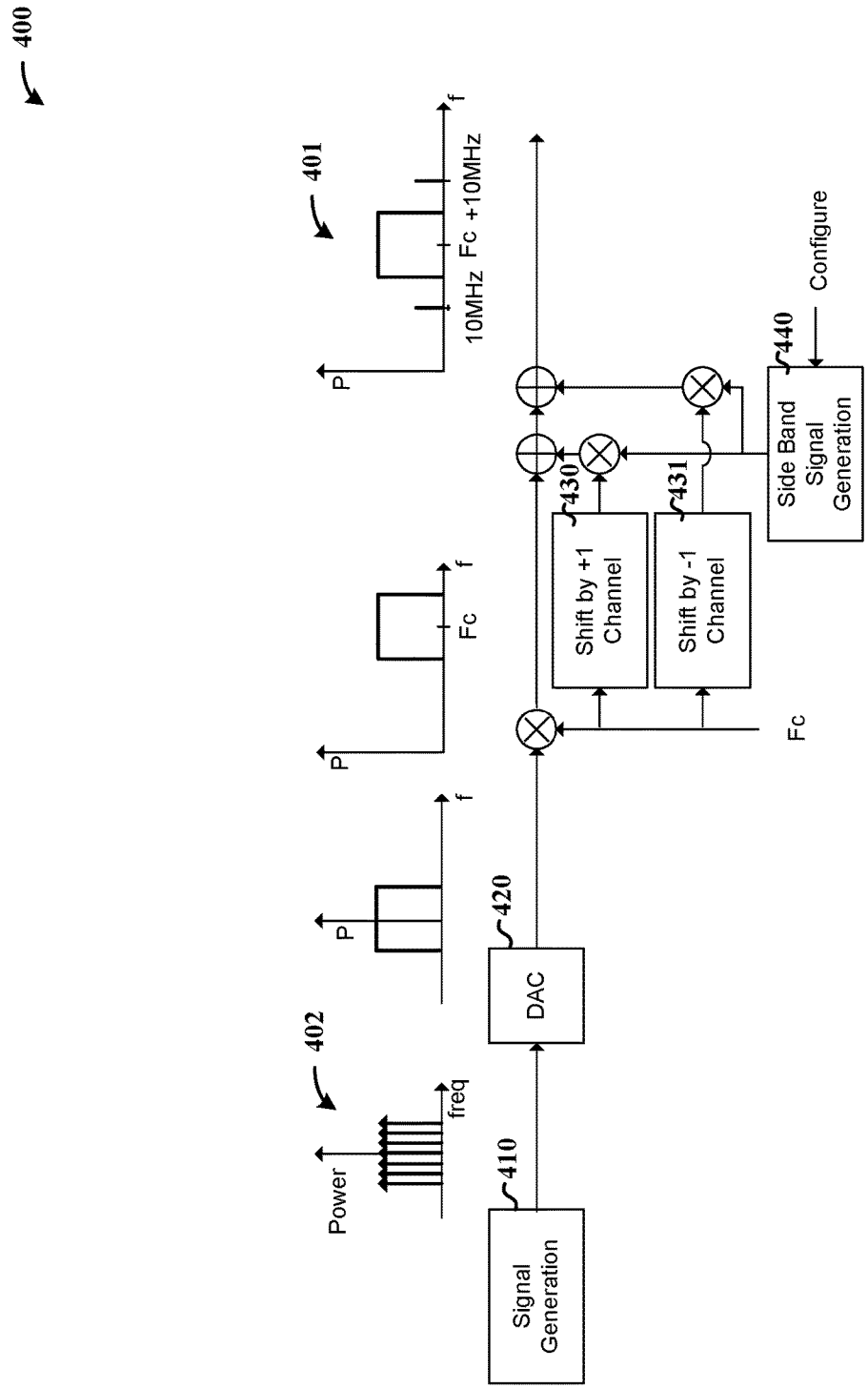
FIG. 4 shows transmission circuitry for communications involving communications suppression via the generation, in the analog domain, and transmission of side channel interference, in accordance with the present disclosure.

FIG. 4 shows circuitry 400 for communications involving communications suppression via the generation, in the analog domain, and transmission of side channel interference, in accordance with the present disclosure. Signal generator block 410 generates a signal for transmission, such as an 802.11P/Wi-Fi signal, which is then converted to an analog signal by digital to analog converter (DAC) 420. An artificial side band interference signal can be generated in the analog domain. This is for example useful when an "improved device" built for multichannel communications includes of a number of narrowband devices.

Accordingly, a channel frequency Fc (e.g., 5.9 GHz) is used for communicating the generated signal, and is shifted by one channel on either side of Fc (e.g., +/− 10 MHz) at blocks 430 and 431 respectively. An artificial side band signal generator block 440 generates the side band signal (e.g., a sine wave, using in input configuration to set amplitude), which is transmitted at the respective frequencies of adjacent channels as set at blocks 430 and 431. The resulting output is shown at 401, with a main signal at center channel Fc and respective artificial signals at adjacent channels +/− 10 MHz.

In some implementations, the signal generator block 410 generates digital/discrete sub-carriers, represented by the up-arrows at 402, in an orthogonal frequency-division multiplexing (OFDM) system, which become (after conversion at DAC 420) an analog/continuous frequency spectrum. A fast Fourier transform (FFT) may be implemented to transform the spectral signal into a time domain signal, with the spectral view being provided herein by way of example. This approach, as well as the center frequency, exemplary side channel offset (10 MHz, use of a sine wave, and other aspects may similarly be implemented with the following figures).

Figure 5:
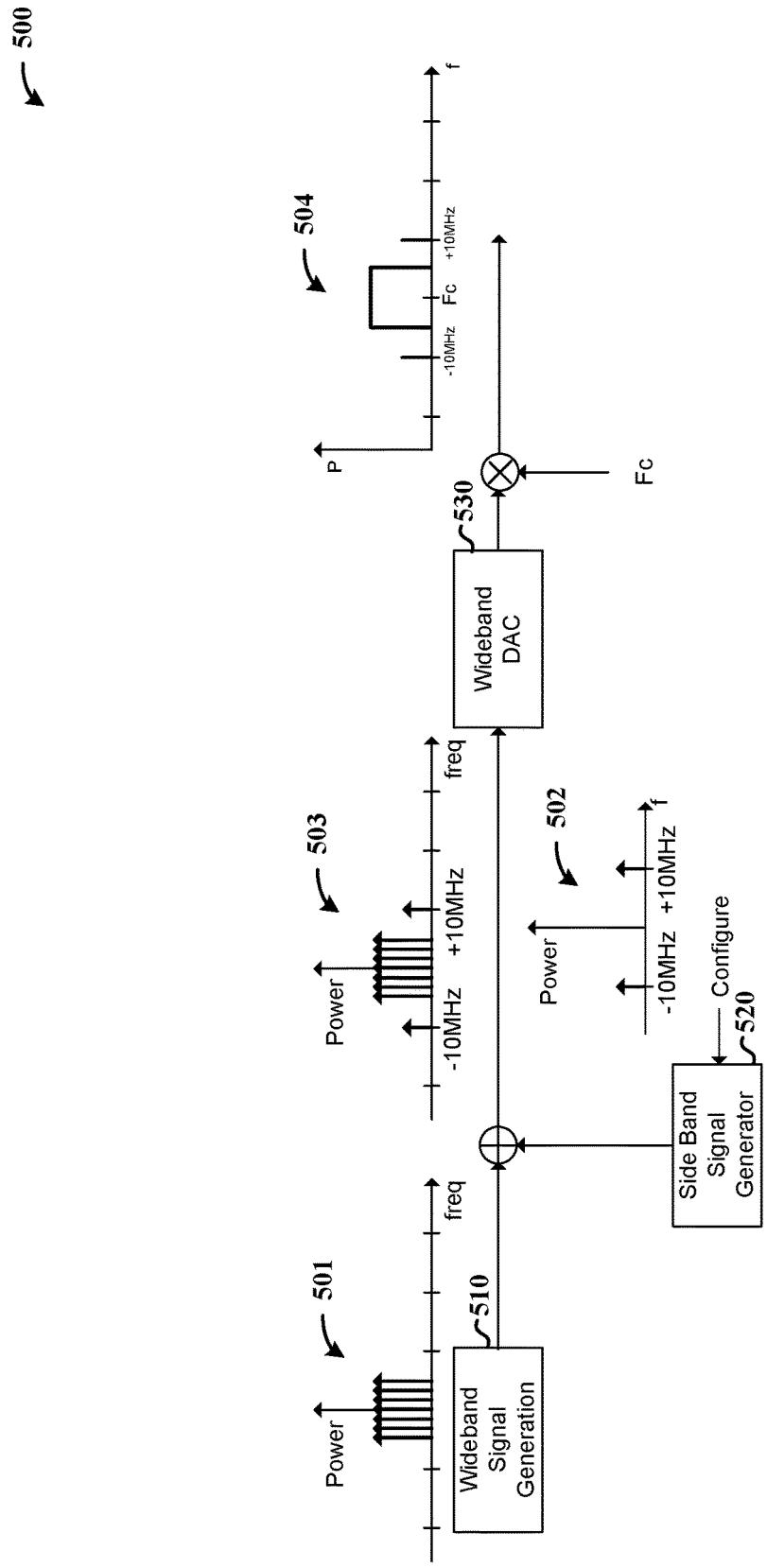
FIG. 5 shows transmission circuitry for communications involving communications suppression via the generation, in the digital domain, and transmission of side channel interference, in accordance with the present disclosure.

FIG. 5 shows circuitry 500 for communications involving communications suppression via the generation, in the digital domain, and transmission of side channel interference in accordance with the present disclosure. Such an artificial side band interference signal can be generated in the digital domain, for example, when an "improved device" built for multichannel communication may utilize a single wideband device. Signal generator block 510 may generate a wideband signal as shown at 501, and a side band signal generator block 520 may generate side band signals to be added thereto, shown by way of example at 502 as being at +/− 10 MHz. The combined signals are shown at 503, which are converted by wideband DAC 530 and transmitted using a central frequency Fc, as shown at 504. As the side band signals (e.g., tones) may be added outside the main channel, a FFT size may be increased accordingly. Further, while implementable via an OFDM system by way of example, such an approach may be used with other systems as well.

Figure 6:
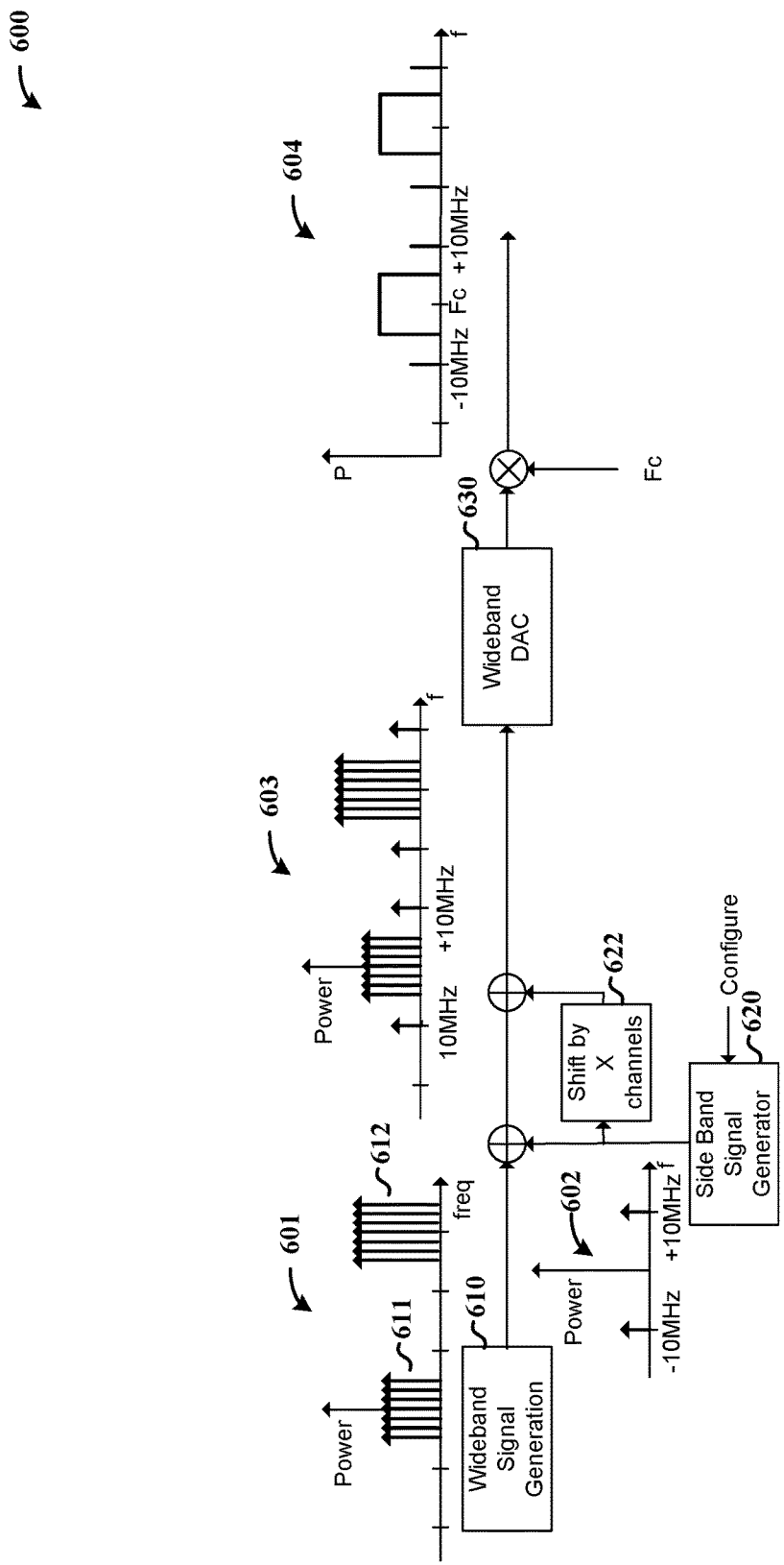
FIG. 6 shows transmission circuitry for communications involving communications suppression via the generation, in the digital domain, and transmission of side channel interference, in accordance with the present disclosure.

FIG. 6 shows circuitry 600 for communications involving communications suppression via the generation, in the digital domain, and transmission of side channel interference, in accordance with the present disclosure. Wideband signal generator block 610 generates wideband signals for multi-channel communication, as shown at 601 at channels 611 and 612. A side band signal generator block 620 generates side band signals as shown at 602, which are added adjacent channel 611 and, by shifting at block 622, adjacent channel 612. The resulting signal is shown at 603, which is converted by wideband DAC 630 and transmitted using frequency Fc as shown at 604.

Figure 7:
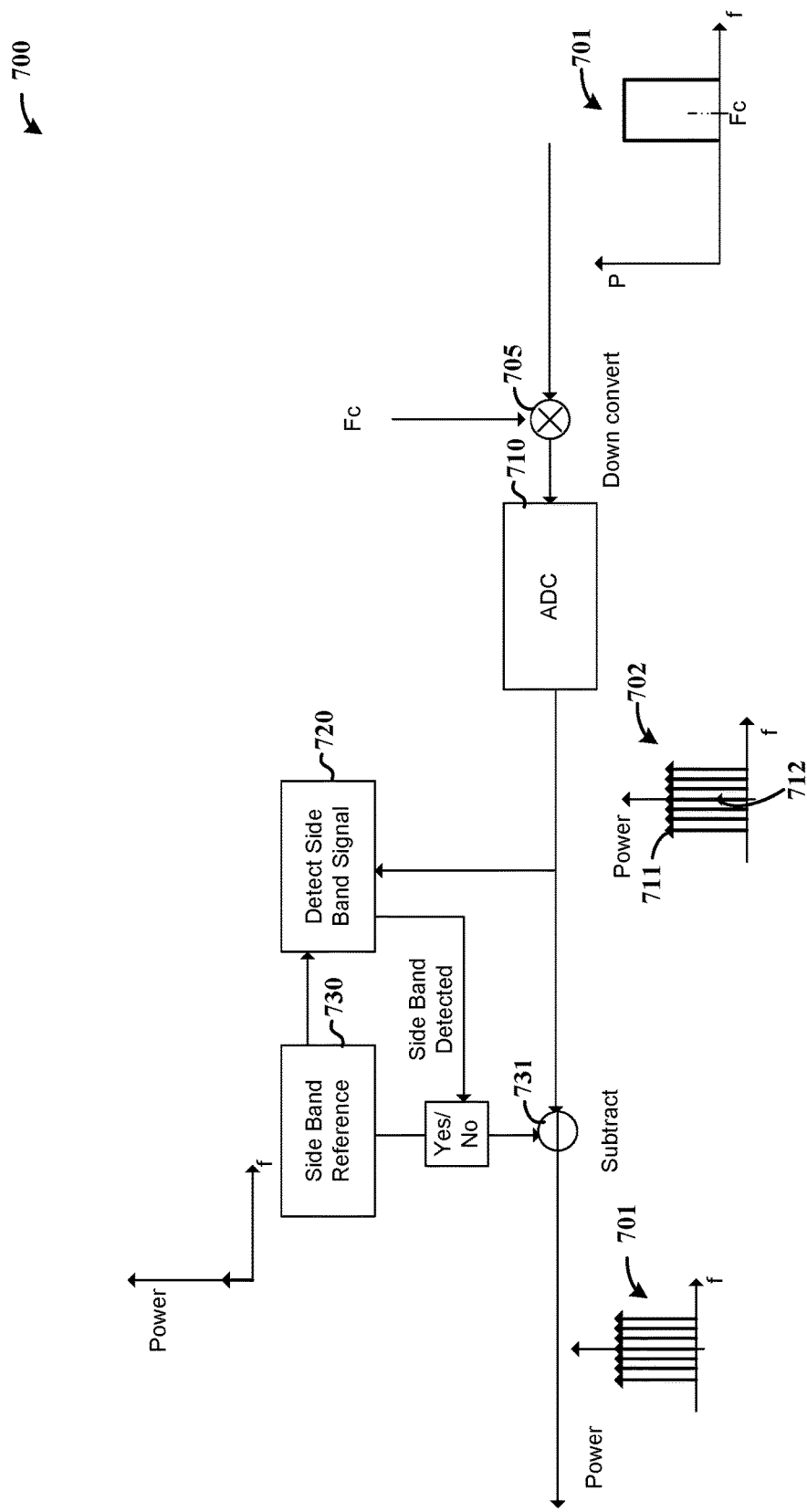
FIG. 7 shows receiver circuitry for narrowband communications involving communications suppression via the generation and transmission of side channel interference, in accordance with the present disclosure.

FIG. 7 shows receiver circuitry 700 for narrowband communications involving communications suppression via the generation and transmission of side channel interference, in accordance with the present disclosure. An analog-to-digital converter (ADC) circuit 710 converts received analog signals having been down-converted using frequency Fc at 705, including a main signal 701, to a digital signal as depicted at 702, having both a main signal 711 and an artificial side band signal 712. Block 720 operates to detect the side band signal 712, such as by detecting a known signal characteristic as depicted herein. A side band reference is generated at block 730 and used, in response to the side band signal 712 being detected, to subtract the side band signal at 731. The resulting signal is depicted at 702 and may be processed accordingly.

Figure 8:
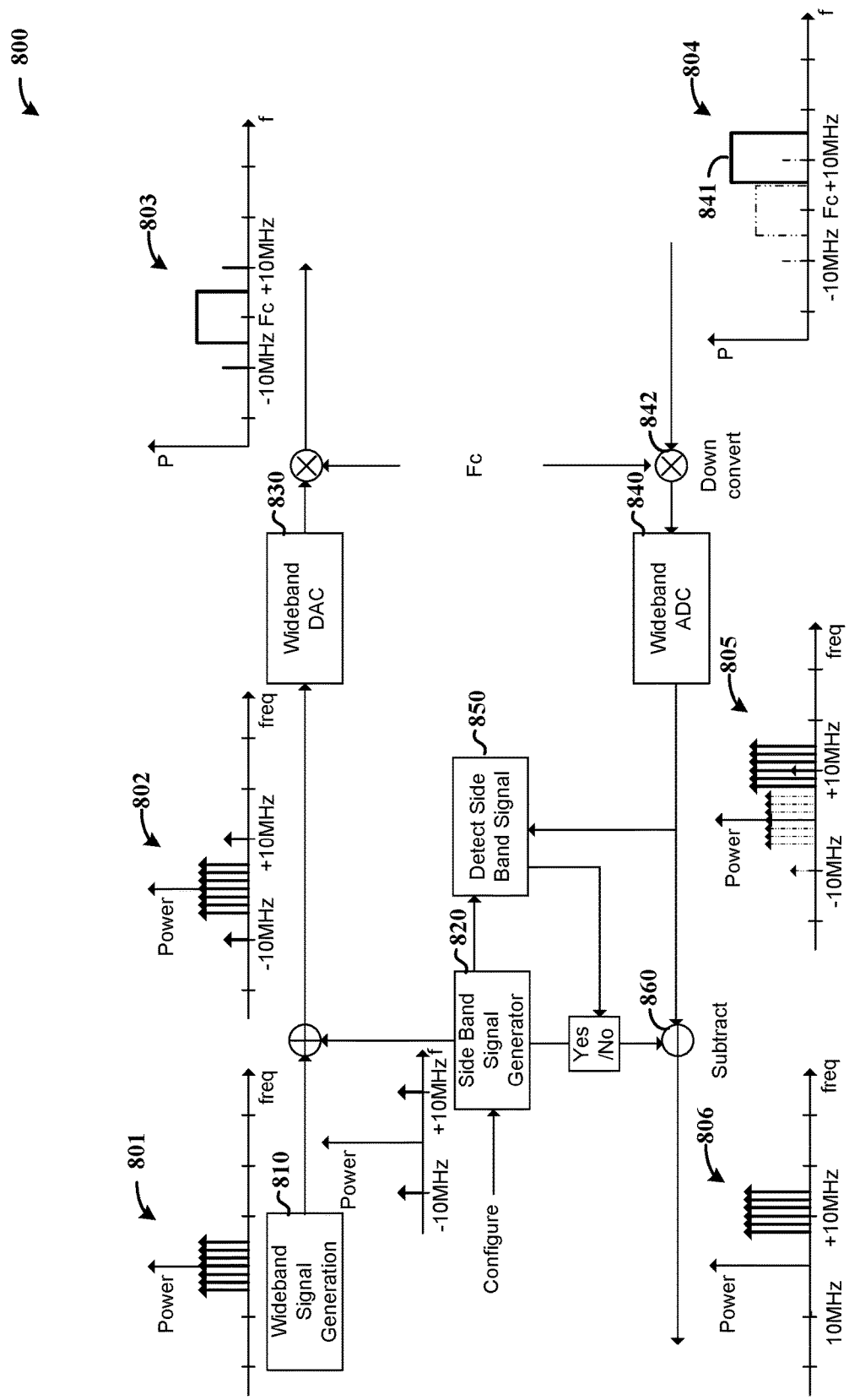
FIG. 8 shows communication circuitry for wideband communications involving communications suppression via side channel interference, in accordance with the present disclosure.

FIG. 8 shows a communication apparatus 800 for (e.g., local) wideband communications involving communications suppression via side channel interference, in accordance with the present disclosure. For transmission, a wideband signal generator 810 generates a wideband signal as shown at 801, and a side band signal generator 820 generates a side band signal that is added to the wideband signal in respective side band channels (+/− 10 MHz) as shown at 802. This signal is then processed by a wideband DAC 830 for transmission as depicted at 803, with the side band signals utilized for suppressing communication by other (e.g., legacy) devices on adjacent channels.

For reception, a wideband ADC 840 converts received signals 804, having been down-converted using frequency Fc at 842, corresponding to signal 803 along with another signal in one of the aforementioned sideband channels 841, with 805 depicting the result. A side band signal detector 850 detects the presence of the side band signal in channel 841, using an output from the side band signal generator 820 to identify the side band signal. When such a side band signal is detected, it is subtracted at 860 from the resulting signal 805 to provide signal 806 for processing.

Figure 9:
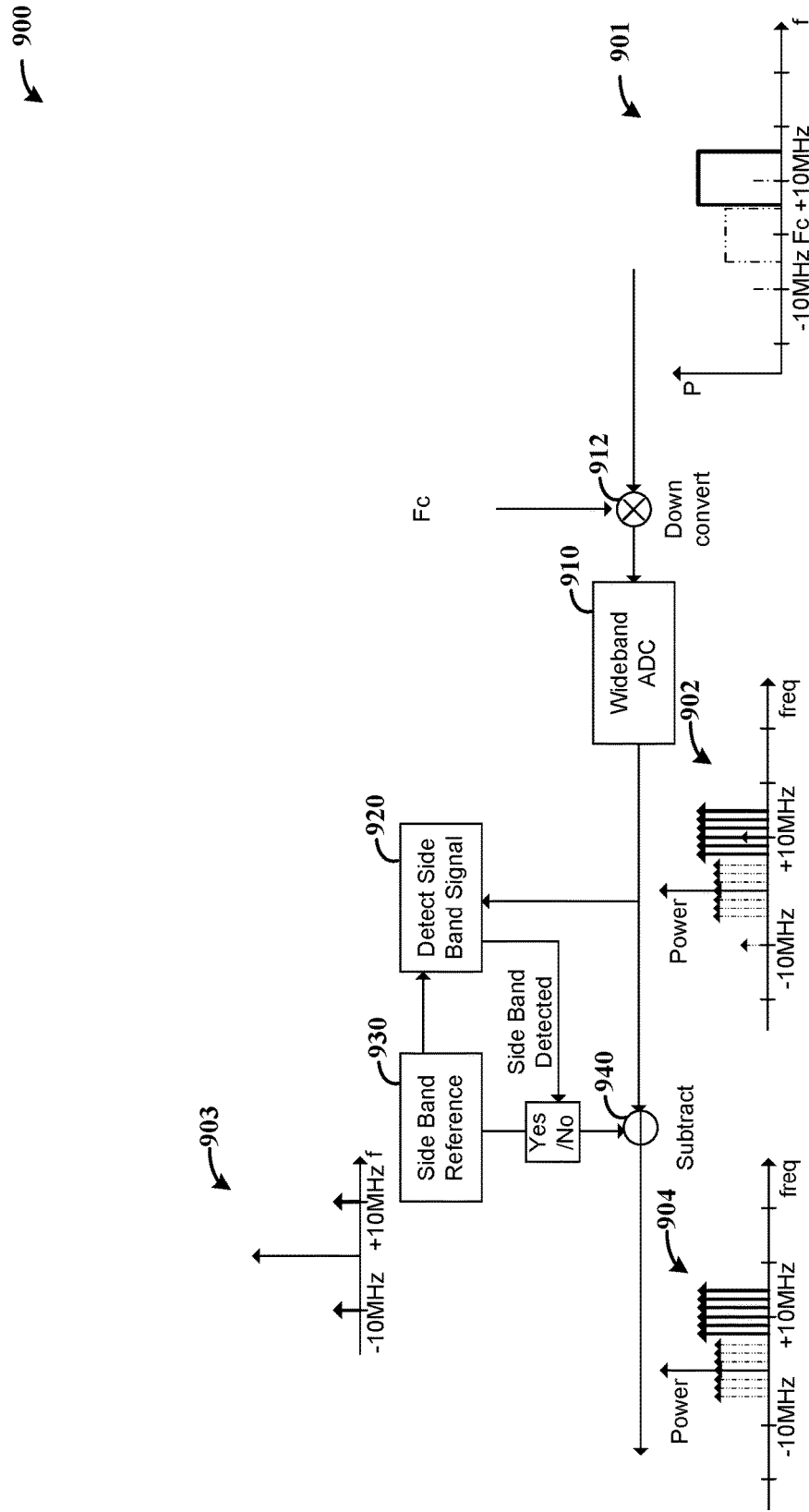
FIG. 9 shows receiver circuitry for wideband communications involving communications suppression via the generation and transmission of side channel interference, in accordance with the present disclosure.

FIG. 9 shows receiver circuitry 900 for (remote) wideband communications involving communications suppression via the generation and transmission of side channel interference, in accordance with the present disclosure. A wideband ADC 910 converts received signals (901) having been down-converted using frequency Fc at 912, resulting in signal 902. A side band signal detector 920 detects the presence of a side band signal using a reference, as may be generated by side band reference generator 930 (depicted at 903). In response to the detection of a side band signal, the reference is used at 940 to subtract the side band signal, resulting in the signal shown at 904.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, transmitter, receiver, converter and/or other circuit-type depictions (e.g., reference numerals 102, 104, 410, 420, 430, 431 and 440 of FIGS. 1 and 4 may depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 1-3. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein, such as in connection with FIGS. 1-3, is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, various other types of side channel selection, offset, and communications may implement generation of artificial interference to suppress communications on a channel. One such example may involve generating interference in a channel, independent of any channel communications (e.g., such a channel need not be a side channel to another communication). Artificial interference in this context may be utilized to suppress communications in any channel environment in which stations communicate based on channel availability. Such modifications do not depart from the true spirit and scope of various aspects of the disclosure, including aspects set forth in the claims

What is claimed is:

1. An apparatus comprising:
communications circuitry configured and arranged to communicate wireless station-to-station communications in which each of a plurality of stations shares a plurality of wireless communications channels;
signal processing circuitry configured and arranged with the communications circuitry to:
transmit enhanced signals for in-band transmissions over a first one of the channels; and while transmitting the enhanced signals, suppressing communications by legacy devices of the plurality of stations on a second one of the channels adjacent the first channel by generating and transmitting a side channel interference signal on the second channel, therein causing legacy devices receiving the enhanced signals to withhold communications on the second channel in response to the side channel interference.

2. The apparatus of claim 1, wherein the signal processing circuitry is configured to facilitate detection and removal of the side channel interference signal by transmitting a side channel interference signal having a predefined characteristic.

3. The apparatus of claim 1, wherein the signal processing circuitry is configured to, for enhanced signals transmitted on one of the channels along with a predefined side-channel interference signal on an adjacent one of the channels, communicate on the adjacent one of the channels in response to identifying the communications on the adjacent one of the channels as being the predefined side channel interference signal.

4. The apparatus of claim 1, wherein the signal processing circuitry is configured to, for enhanced signals transmitted on one of the channels and a predefined side-channel interference signal on an adjacent one of the channels, receive communications on the adjacent one of the channels by identifying and removing the predefined side channel interference.

5. The apparatus of claim 4, wherein the received communications are enhanced signals received from another one of the plurality of stations, and the signal processing circuitry is configured to facilitate transmission of the received communications by transmitting the side channel interference signal with characteristics detectable by the other one of the plurality of stations.

6. The apparatus of claim 1, wherein the signal processing circuitry is configured to, for enhanced signals transmitted on one of the channels and a predefined side-channel interference signal on an adjacent one of the channels, transmit signals on the adjacent one of the channels in response to identifying communications on the adjacent one of the channels as being predefined side channel interference.

7. The apparatus of claim 1, wherein the signal processing circuitry is configured and arranged with the communications circuitry to simultaneously communicate signals on multiple ones of the wireless communications channels.

8. The apparatus of claim 1, wherein the signal processing circuitry is configured to suppress the communications by legacy devices on a third one of the channels adjacent the first channel by generating and transmitting a side channel interference signal on the third channel.

9. The apparatus of claim 1, wherein the signal processing circuitry is configured and arranged to suppress communications by legacy devices on a third one of the channels adjacent the first channel and opposite the second channel by transmitting the side channel interference signal on the third channel.

10. The apparatus of claim 1, wherein the signal processing circuitry includes:
a wideband signal generator that is configured and arranged to generate the enhanced signals as wide band signals;
a side band signal generator configured and arranged to generate the channel interference signal, the signal processing circuitry being configured and arranged with the communications circuitry to transmit each wide band signal and corresponding interference signal as a multichannel signal on the first and second channels; and
circuitry configured to detect and remove side band signals based on the channel interference signal generated by the side band signal generator.

11. A method comprising:
transmitting enhanced signals for in-band transmissions over a first one of a plurality of wireless communications channels shared by a plurality of stations for communicating wireless station-to-station communications; and
while transmitting the enhanced signals, suppressing communications by legacy devices of the plurality of stations on a second one of the plurality of wireless communications channels that is adjacent the first channel, by generating and transmitting a side channel interference signal on the second channel and therein causing legacy devices receiving the enhanced signals to withhold communications on the second channel in response to the side channel interference.

12. The method of claim 11, further including facilitating detection and removal of the side channel interference signal by transmitting a side channel interference signal having a predefined characteristic.

13. The method of claim 11, further including, for enhanced signals transmitted on one of the channels along with a predefined side-channel interference signal on an adjacent one of the channels, communicating on the adjacent one of the channels in response to identifying the communications on the adjacent one of the channels as being the predefined side channel interference signal.

14. The method of claim 11, further including, for enhanced signals transmitted on one of the channels and a predefined side-channel interference signal on an adjacent one of the channels, receiving communications on the adjacent one of the channels by identifying and removing the predefined side channel interference.

15. The method of claim 11, further including, for enhanced signals transmitted on one of the channels and a predefined side-channel interference signal on an adjacent one of the channels, transmitting signals on the adjacent one of the channels in response to identifying communications on the adjacent one of the channels as being predefined side channel interference.

16. The method of claim 11, further including suppressing the communications by legacy devices on a third one of the channels adjacent the first channel by generating and transmitting a side channel interference signal on the third channel.

17. The method of claim 11, further including suppressing communications by legacy devices on a third one of the channels adjacent the first channel and opposite the second channel by transmitting the side channel interference signal on the third channel.

18. The method of claim 11, further including effecting multiband transmission by transmitting another enhanced signal on another channel, concurrently with the enhanced signals transmitted over the first one of the wireless communications channels.

19. An apparatus comprising:
communications circuitry configured and arranged to transmit and receive multichannel signals over a wireless network in which each of a plurality of stations utilizes wireless communications channels;

data signal generator circuitry configured and arranged to generate a data signal for transmitting data on one of the communications channels; and side band signal generator circuitry configured and arranged to generate an artificial interference signal for transmitting interference on side channels adjacent the one of the communications channels, the communications circuitry being configured to transmit a multichannel signal having the data signal in the one of the communications channels and the artificial interference signal on the side channels adjacent the one of the communications channels.

20. The apparatus of claim 19, further including receiver circuitry configured and arranged to:

receive multichannel signals over the wireless network, the received multichannel signals including signals in a data channel and artificial interference signals in channels adjacent the data channel; and remove the artificial interference signals and thereafter processing the received multichannel signals with the artificial interference signals removed therefrom.

\* \* \* \* \*